(12) United States Patent
Yamamoto

(10) Patent No.: US 7,595,472 B2
(45) Date of Patent: Sep. 29, 2009

(54) OPTICAL HEAD DEVICE

(75) Inventor: Yuichiro Yamamoto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 37 days.

(21) Appl. No.: 12/038,587

(22) Filed: Feb. 27, 2008

(65) Prior Publication Data

US 2008/0315069 A1 Dec. 25, 2008

Related U.S. Application Data

(62) Division of application No. 11/388,616, filed on Mar. 24, 2006, now Pat. No. 7,358,471.

(30) Foreign Application Priority Data

Jul. 7, 2005 (JP) ............................. 2005-199140

(51) Int. Cl.
*G11B 7/00* (2006.01)
(52) U.S. Cl. ............. 250/201.5; 369/44.24; 369/112.01
(58) Field of Classification Search ............. 250/201.2, 250/201.4, 201.5, 216, 237 R; 369/44.14, 369/44.23, 44.24, 53.13, 53.2, 112.01, 112.02, 369/118
See application file for complete search history.

(56) References Cited

U.S. PATENT DOCUMENTS

| 5,103,605 | A | 4/1992 | Sul |
| 5,123,630 | A | 6/1992 | Watson et al. |
| 5,126,995 | A | 6/1992 | Nishizawa |
| 5,798,994 | A | 8/1998 | Kamatani |
| 7,358,471 | B2 * | 4/2008 | Yamamoto ............... 250/201.5 |
| 2006/0221785 | A1 | 10/2006 | Yamamoto |
| 2006/0239143 | A1 | 10/2006 | Yamamoto et al. |

FOREIGN PATENT DOCUMENTS

| JP | 06-124477 | 5/1994 |
| JP | 06-180851 | 6/1994 |
| JP | 07-021565 | 1/1995 |
| JP | 2001-209965 | 8/2001 |
| JP | 2003-196880 | 7/2003 |
| JP | 2003-323736 | 11/2003 |
| JP | 2004-272949 | 9/2004 |

OTHER PUBLICATIONS

Japanese Office Action dated Jan. 6, 2009 corresponding to U.S. Appl. No. 12/038,587 filed on Feb. 27, 2008.

* cited by examiner

*Primary Examiner*—Kevin Pyo
(74) *Attorney, Agent, or Firm*—Turocy & Watson, LLP

(57) ABSTRACT

An optical head device includes a light source which emits a light beam, an objective lens which condenses the light beam on the optical disk, a condensing lens which condenses reflected light from the optical disk, a liquid crystal panel disposed near a focal point of the condensing lens and having pixels, a driver which drives the pixels of the liquid crystal panel to pass the reflected light from a reproduction layer of the optical disk and partially interrupt the reflected light from a non-reproduction layer of the optical disk, and a photodetector which detects light passed through the liquid crystal panel.

5 Claims, 7 Drawing Sheets

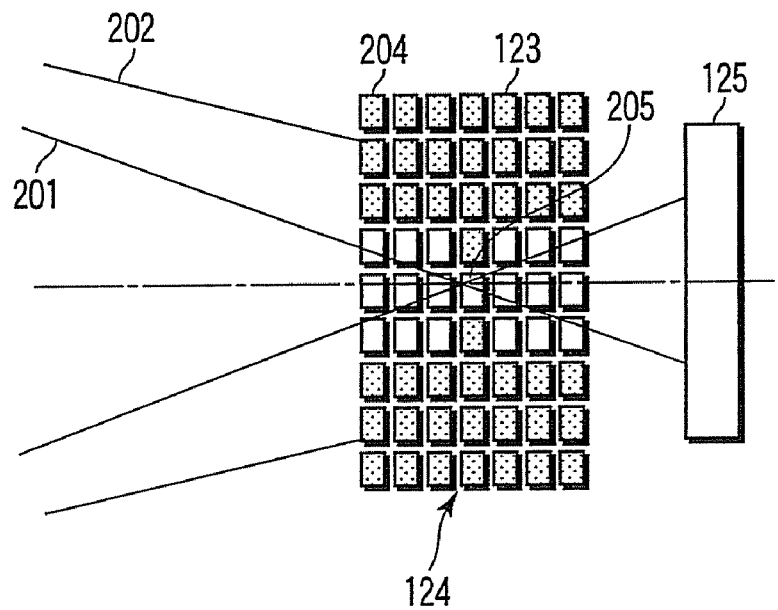
F I G. 9
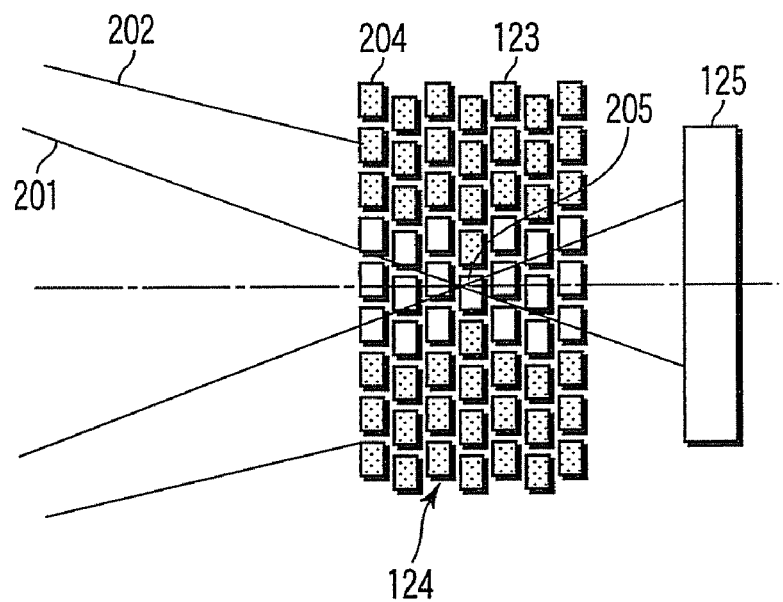
F I G. 10

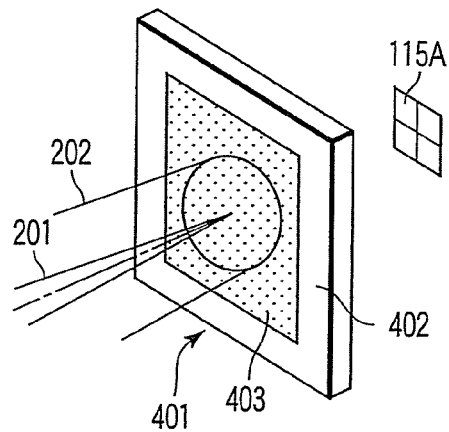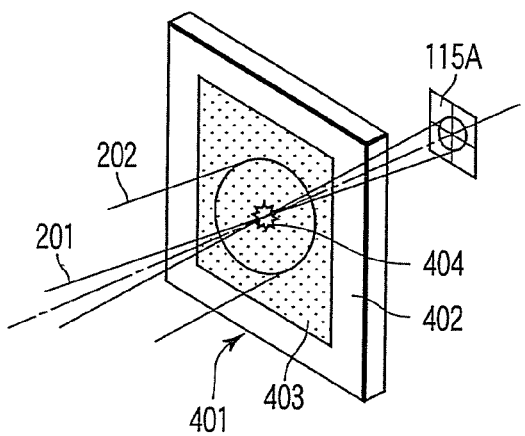
FIG. 11A  FIG. 11B
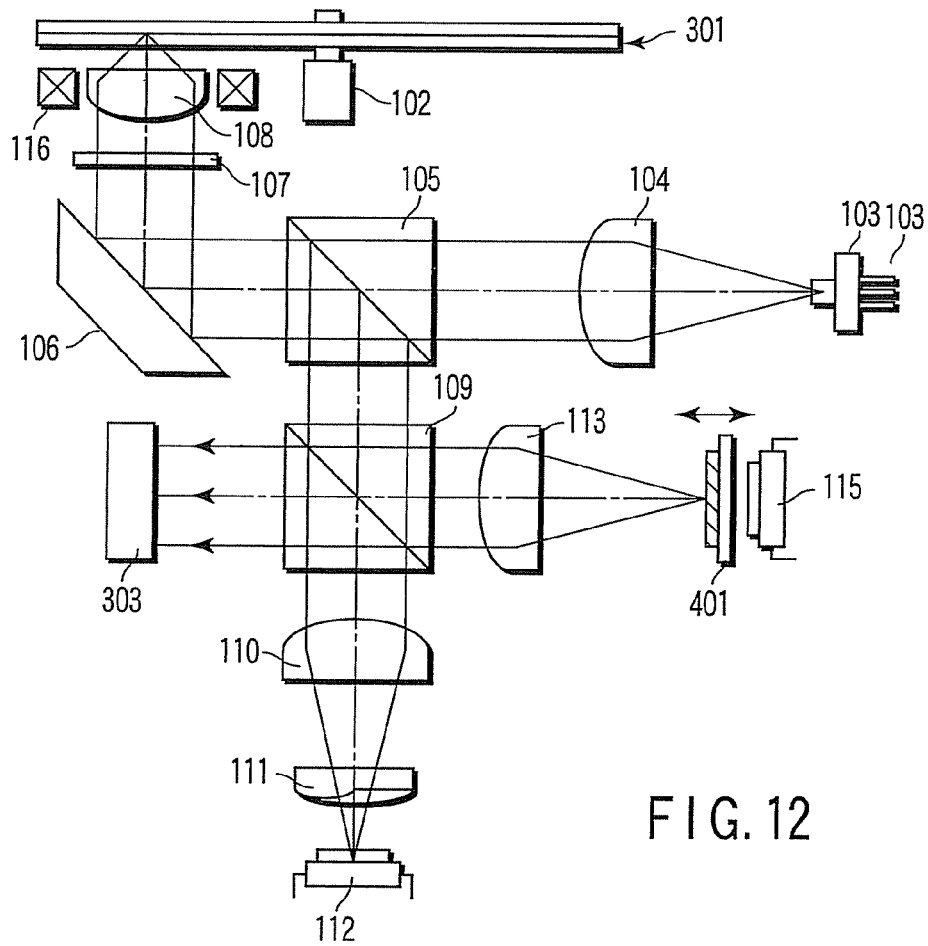
FIG. 12

OPTICAL HEAD DEVICE

CROSS-REFERENCE TO RELATED APPLICATIONS

This application claims the benefit of priority from and is a Divisional application of application Ser. No. 11/388,616 filed Mar. 24, 2006, which is based upon and claims the benefit of priority from prior Japanese Patent Application No. 2005-199140, filed Jul. 7, 2005, the entire contents of both applications are incorporated herein by reference.

BACKGROUND OF THE INVENTION

1. Field of the Invention

The present invention relates to an optical head device which reproduces information recorded in a multilayered optical disk.

2. Description of the Related Art

In a situation in which an infrastructure capable of enjoying digital information of a dynamic image increasingly upgrades and expands such as satellite digital broadcasting or ground digital broadcasting, there is a demand for realization of a conveyable recording medium capable of recording a larger capacity of higher-definition digital information. To meet this demand, there are developed various types of next-generation high-density optical disks each having a recording capacity three or four times that of a presently spreading digital versatile disk (DVD). Among them, there is developed an HD DVD using a blue purple laser diode having a 405 nm wavelength band and an objective lens having an optimized substrate thickness of 0.6 mm and a numerical aperture of 0.65, from viewpoints of compatibility with the existing compact disk (CD) and DVD, ease of realizing a thin optical head device for a notebook-size personal computer, a low drive manufacturing cost, and a low disk manufacturing cost. In the HD DVD, development of a double-layer disk including double recording layers is advanced in parallel in the same manner as in the DVD for a purpose of further increasing a recording information amount.

The substrate thickness of the double-layer disk deviates from that of a single-layer disk, which is 0.6 mm. Therefore, a wave aberration is generated in a beam spot, and optical characteristics deteriorate. To suppress the wave aberration to an allowable value or less in the double-layer disk of the existing DVD, an interlayer thickness between two recording layers is defined as 55 μm±15 μm. When aberration standards similar to those of the DVD are applied to the HD-DVD, the interlayer thickness between two layers is reduced to about 25 μm. This is because the wave aberration generated with respect to an error of the substrate thickness is substantially proportional to the fourth power of the objective lens numerical aperture, and inversely proportional to a laser wavelength. Since the interlayer thickness of the HD DVD becomes smaller than that of the DVD in this manner, there is a remarkable influence of a phenomenon where undesired light reflected by a non-reproduction layer of two recording layers leaks to and falls on a photodetector, which is a so-called interlayer crosstalk. That is, since the interlayer thickness is small in the HD DVD, a beam diameter of the leak light from the non-reproduction layer on the face of the photodetector is smaller than that of the DVD. Therefore, a quantity of leak light increases. This is a cause for deterioration of a reproduction signal. Therefore, in addition to defining of the interlayer thickness, an interlayer crosstalk reducing measure is necessary in the HD DVD.

Jpn. Pat. Appln. KOKAI Publication No. 2003-323736 discloses an interlayer crosstalk reducing method due to a pinhole element with reference to, for example, FIG. 1. A position of the pinhole element is adjusted to pass signal light from a reproduction layer. Since the beam diameter of the leak light from the non-reproduction layer increases on the pinhole element, a large part of the leak light is interrupted by the pinhole element. That is, the signal light can pass through the pinhole element, but a large part of the leak light cannot pass through the pinhole element. As a result, the interlayer crosstalk is effectively reduced. The position of the pinhole element needs to be mechanically adjusted with good precision with respect to three axes, that is, an optical axis (z-axis) and two axes (x-axis and y-axis) crossing each other at right angles in a plane perpendicular to the optical axis. Therefore, the pinhole element is usable in an experimental level, but it is substantially difficult to mount the element on a product.

Jpn. Pat. Appln. KOKAI Publication No. 6-180851 discloses that a liquid crystal shutter whose aperture size and position are adjustable is disposed in a focal plane of a lens for condensing reflected light from an optical information recording medium or near the focal plane with reference to, for example, FIG. 1. This liquid crystal shutter is disposed for a purpose of applying to the photodetector a light beam having a diameter which is smaller than a diffraction limit diameter of the condensing lens, and the shutter is not used for the reduction of the interlayer crosstalk.

BRIEF SUMMARY OF THE INVENTION

An optical head device according to an aspect of the present invention comprises a light source which emits a light beam, an objective lens which condenses the light beam on an optical disk, a condensing lens which condenses reflected light from the optical disk, a liquid crystal panel disposed near a focal point of the condensing lens and having pixels, a driver which drives the pixels of the liquid crystal panel to pass the reflected light from a reproduction layer of the optical disk and partially interrupt the reflected light from a non-reproduction layer of the optical disk, and a photodetector which detects light passed through the liquid crystal panel.

An optical head device according to another aspect of the present invention comprises a light source which emits a light beam, an objective lens which condenses the light beam on an optical disk, a condensing lens which condenses reflected light from the optical disk, a shielding element disposed near a focal point of the condensing lens and having a pinhole, and a photodetector which detects light passed through the pinhole of the shielding element. The light source is capable of selectively emit a high-output light beam and a low-output light beam. The shielding element includes a transparent substrate and a thin film disposed on the transparent substrate. The thin film is partially melted by application of the high-output light beam to form the pinhole. The pinhole passes the reflected light from a reproduction layer of the optical disk and partially interrupts the reflected light from a non-reproduction layer of the optical disk.

BRIEF DESCRIPTION OF THE SEVERAL VIEWS OF THE DRAWING

FIG. 9 shows a driven state of the multilayered liquid crystal panel shown in FIG. 8;

FIG. 10 shows another driven state of the multilayered liquid crystal panel shown in FIG. 8;

FIGS. 11A and 11B show a shielding element in an optical head device in a fourth embodiment of the present invention; and FIG. 12 shows a method of adjusting a position of the shielding element shown in FIGS. 11A and 11B.

DETAILED DESCRIPTION OF THE INVENTION

Embodiments of the present invention will be described hereinafter in detail with reference to the drawings.

First Embodiment

Figure 1:
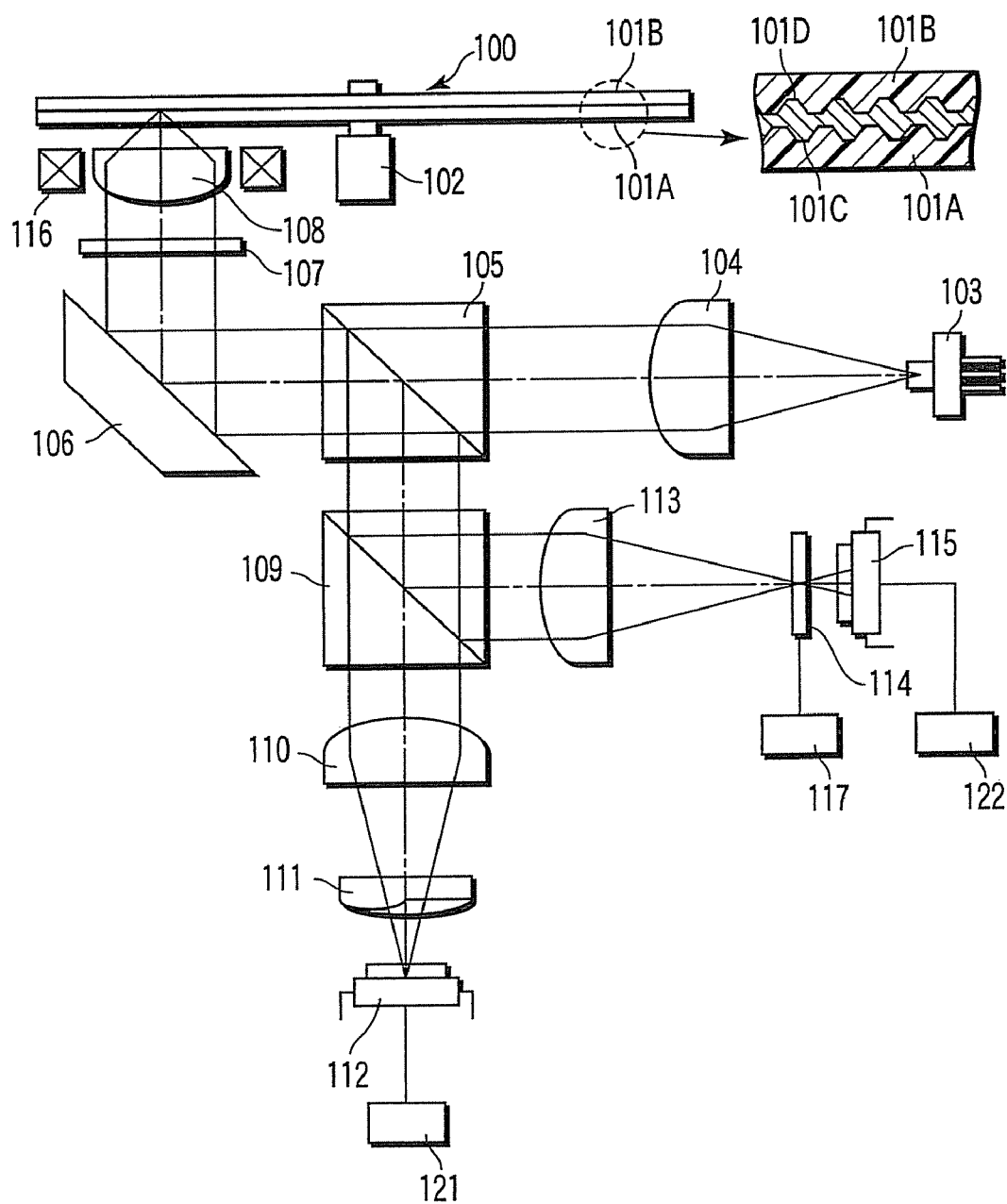
FIG. 1 shows an optical head device in a first embodiment of the present invention.

FIG. 1 shows an optical head device in a first embodiment of the present invention. In FIG. 1, an optical disk 100 is a double-layer optical disk including two recording layers 101A and 101B each provided with, for example, spiral groove and land regions. The recording layer 101A nearer to an incidence side of a light beam is referred to as a 0-th recording layer, and the recording layer 101B farther from the incidence side of the light beam is referred to as a first recording layer. The optical disk 100 is rotated by a spindle motor 102 during recording and reproducing.

The optical head device includes a laser light source 103 which emits a light beam, a collimator lens 104 which changes the light beam from the laser light source 103 into a parallel light beam, an objective lens 108 which condenses the light beam onto the optical disk 100, and a polarization beam splitter 105 which separates light directed to the optical disk 100 and light reflected from the optical disk 100. The optical head device further includes a raising mirror 106 and a ¼ wavelength plate 107 on an optical path between the polarization beam splitter 105 and the objective lens 108. The optical head device includes a beam splitter 109 which splits the reflected light beam from the optical disk 100 on an optical path of the reflected light returning from the optical disk 100 and split by the polarization beam splitter 105. The optical head device further includes a first condensing lens 110 which condenses the reflected light from the optical disk 100, a cylindrical lens 111 which gives an astigmatism to the reflected light, and a first photodetector 112 having light receiving regions on a transmission optical path of the polarization beam splitter 105. On a reflection optical path of the polarization beam splitter 105, the device includes a second condensing lens 113 which condenses the reflected light from the optical disk 100, a liquid crystal panel 114 disposed near a focal point of the second condensing lens 113 and having pixels, and a photodetector 115 which detects light passed through the liquid crystal panel 114.

During recording of information in the 0-th recording layer 101A or the first recording layer 101B, or reproducing of the information from the 0-th recording layer 101A or the first recording layer 101B, the light beam is focused on a recording layer as a recording object or a recording layer (reproduction layer) as a reproduction object by a light application unit including a laser light source 103 such as a laser diode, the collimator lens 104, the polarization beam splitter 105, the raising mirror 106, the ¼ wavelength plate 107, and the objective lens 108.

The reproducing will be described. The beam of linearly polarized light emitted from the laser light source 103 is converted from a diverging light beam into a parallel light beam by the collimator lens 104, then passes through the polarization beam splitter 105, and is further reflected by the raising mirror 106 to enter the ¼ wavelength plate 107. The parallel light beam applied to the ¼ wavelength plate 107 is converted into circularly polarized light, and focused on (one of reflection layers 101C and 101D of) the reproduction layer (one of the recording layers 101A and 101B) of the optical disk 100 by the objective lens 108.

The light reflected by the reproduction layer is converted into linearly polarized light perpendicular to the incoming linearly polarized light through the objective lens 108 and the ¼ wavelength plate 107 in reverse to the incident light, and then reflected by the raising mirror 106 to enter the polarization beam splitter 105. The polarization beam splitter 105 reflects the light beam applied from the raising mirror 106 to bring it to the beam splitter 109. The beam splitter 109 splits the applied light beam into a parallel light beam for focusing control and a parallel light beam for both tracking control and reproducing in accordance with a predetermined light quantity ratio.

The parallel light beam for focusing control, transmitted through the beam splitter 109, is converted into a convergent light beam by the first condensing lens 110, and further refracted by and passed through the cylindrical lens 111. Thereafter, the light beam is condensed onto the first photodetector 112. The light beam on a light receiving face of the first photodetector 112 is formed into an elliptical shape, if there is a focal error. Moreover, directions of long and short axes of the ellipse change depending on a direction of focal deviation. By use of this, a focal error signal is generated by a focal error detection calculator 121. The objective lens 108 is driven in a direction perpendicular to faces of the recording layers 101A and 101B by a lens actuator 116 based on this focal error detection signal. Accordingly, the light beam is correctly focused on the reproduction layer. Here, as a focal error detection method, a typical astigmatism method has been described, but the focal error detection method is not limited to this method, and a method such as a knife edge method or a beam size method may be used.

On the other hand, the parallel light beam for both the tracking control and the reproducing, reflected by the beam splitter 109, is converted into a convergent light beam by the second condensing lens 113, and then passes through the liquid crystal panel 114, disposed near the focal point of the condensing lens 113 and having pixels, to enter the second photodetector 115. The liquid crystal panel 114 is driven by a liquid crystal driver 117. The second photodetector 115 is a multi-segment detector having, for example, four light receiving faces, each of which generates an output signal depending on incident light quantity. Output signals respectively corresponding to the light receiving faces of the second photodetector 115 are subjected to a known calculation equation in a calculator 122 to thereby generate a reproduction signal and a tracking error signal. The objective lens 108 is driven in in-plane directions of the recording layers 101A and 101B by the lens actuator 116 based on the tracking error signal, and the light beam are positioned in a target track on the reproduction layer.

Figure 2:
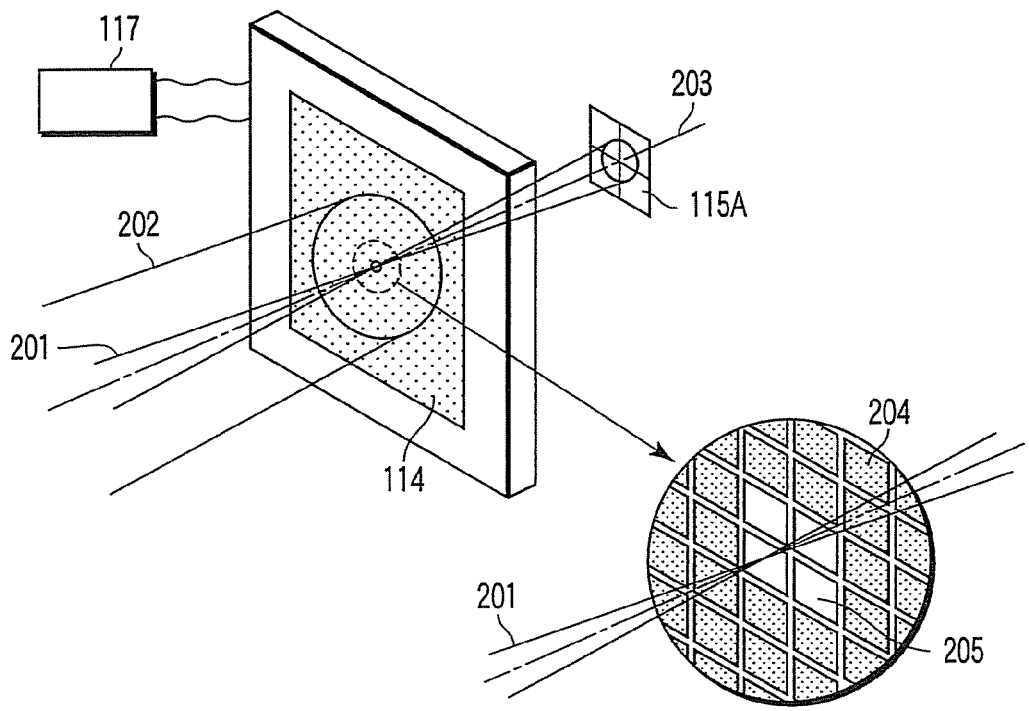
FIG. 2 shows details of a liquid crystal panel shown in FIG. 1.

The liquid crystal panel 114 has square pixels 204 as shown in, for example, FIG. 2. The pixels 204 are selectively brought into a transmitted state by the liquid crystal driver 117. For example, the pixels 204 are voltage-driven by the liquid crystal driver 117, brought into the transmitted state during application of a voltage, and brought into a non-transmitted state in a case where any voltage is not applied.

Signal light 201 as the reflected light from the reproduction layer of the optical disk 100, and the reflected light from the non-reproduction layer, that is, leak light 202 enter the liquid crystal panel 114. A beam diameter of the leak light 202 is larger than that of the signal light 201 on the liquid crystal panel 114. Therefore, among the pixels 204 shown in FIG. 2, pixels irradiated with the signal light 201 and shown in white are brought into the transmitted state to form a pinhole 205, and the other pixels of regions shown by dots are brought into the non-transmitted state. As a result, a large part of the leak light 202 is interrupted by the liquid crystal panel 114, but the signal light 201 passes through the pinhole 205, and therefore interlayer crosstalk is largely reduced.

Figure 3:
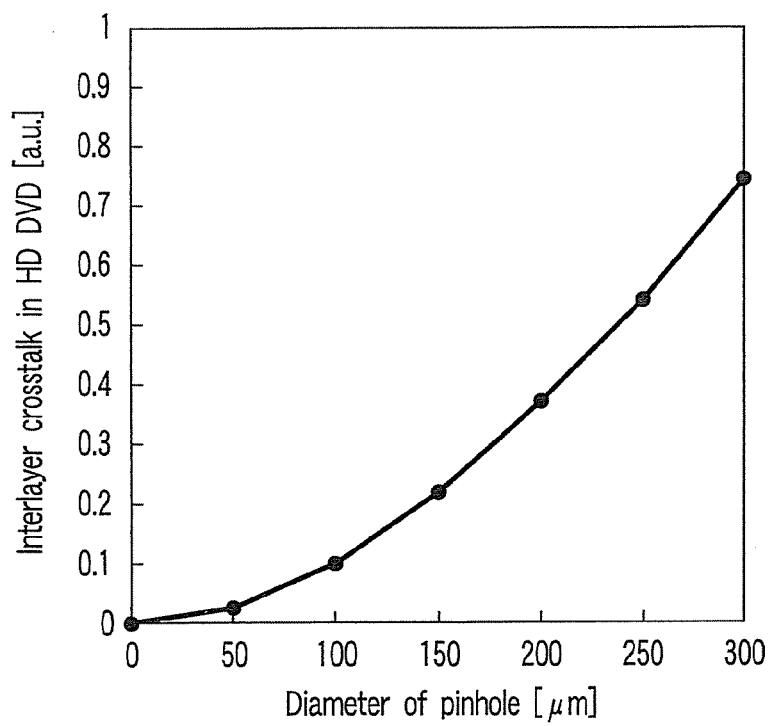
FIG. 3 shows a relation between a pinhole diameter of the liquid crystal panel and interlayer crosstalk.

FIG. 3 shows an analysis result of an interlayer crosstalk amount (quantity of leak light to the light receiving face of the second photodetector 115) with respect to a pinhole diameter (diameter of the pinhole 205). Analysis conditions were set to an interlayer thickness of 25 µm between the recording layers 101A and 101B of the optical disk 100, an optical system magnification of eight times, and a light receiving face size of 100 µm×100 µm of the second photodetector 115. In FIG. 3, the ordinate indicates a value obtained by standardizing a leak amount in a case where the pinhole 205 is disposed by use of a leak light quantity in a case where any pinhole 205 is not disposed. As seen from FIG. 3, when the pinhole diameter is set to 200 µm or less, the interlayer crosstalk is reduced to ½ or less. To set the pinhole diameter to 200 µm or less, it is preferable to set a pixel size of the liquid crystal panel 114 to about 20 µm or less.

Figure 4:
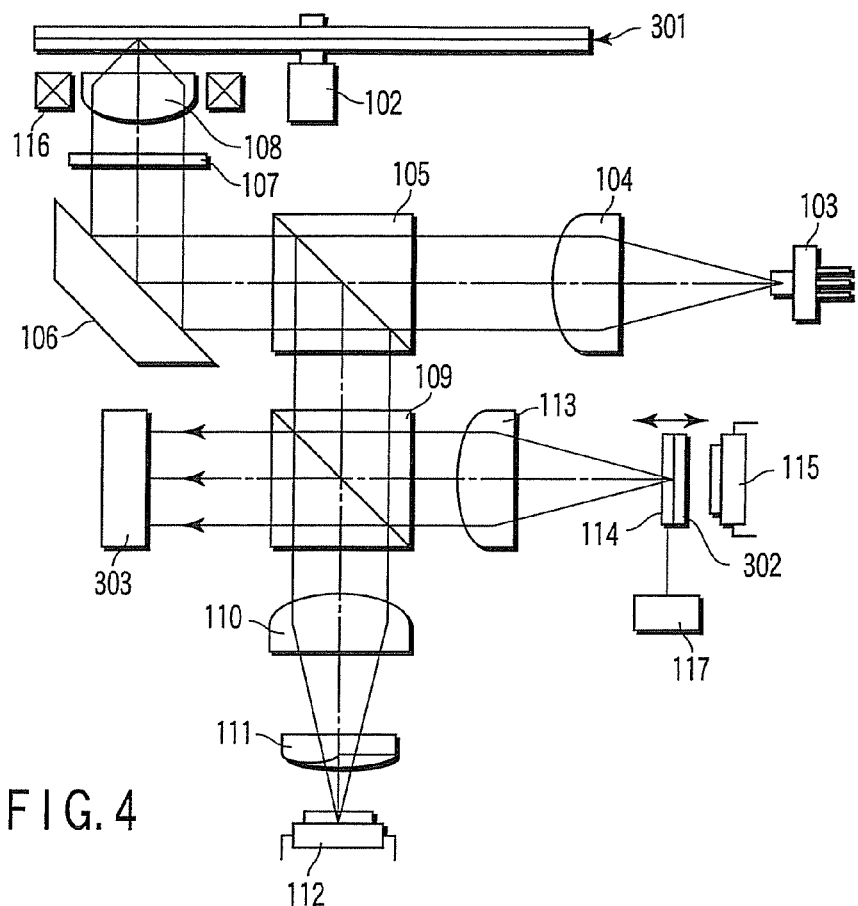
FIG. 4 shows a method of adjusting a position of the liquid crystal panel shown in FIG. 1.

Next, there will be described a method of adjusting a position of the liquid crystal panel 114 with reference to FIG. 4. The method is performed during adjustment in assembling the optical head device shown in FIG. 1. The position of the liquid crystal panel 114 is adjusted in a procedure of the following steps S1 to S6.

<Step S1>

A mirror disk 301 for adjustment is set instead of the optical disk 100, and the objective lens 108 is focused on the surface of the mirror disk 301 for adjustment by the lens actuator 116. A single-layer disk having a flat light reflecting face having a high reflectance may be used in the mirror disk 301 for adjustment.

<Step S2>

A mirror 302 for adjustment is disposed on the back of the liquid crystal panel 114.

<Step S3>

All of the pixels 204 of the liquid crystal panel 114 are brought into transmitted states.

<Step S4>

The light transmitted through the liquid crystal panel 114, reflected by the mirror 302 for adjustment, and transmitted through the beam splitter 109 is caused to enter a collimation tester 303 for adjustment.

<Step S5>

While observing a convergent/divergent state of the incidence light by the collimation tester 303 for adjustment, the position of the liquid crystal panel 114 along the optical axis is adjusted so that the incidence light forms a parallel light beam. It is to be noted that since the second condensing lens 113 usually has a numerical aperture of about 0.06 to 0.08, the condensing lens 113 has a focal depth of about 30 µm to 60 µm. Therefore, the adjustment of the position of the liquid crystal panel 114 along the optical axis is not a difficult operation.

<Step S6>

The mirror 302 for adjustment is removed. While monitoring the photodetector 115 so that an incident light quantity does not decrease, pixels to which any light is not applied are turned off, and pixels to which the light is applied are turned on by the liquid crystal driver 117 among the pixels 204 of the liquid crystal panel 114 to form the pinhole 205.

The pinhole 205 is formed using the liquid crystal panel 114 in this manner, and this provides an advantage that mechanical adjustment in an in-plane direction perpendicular to the optical axis, which is usually necessary for pinholes, is obviated or simplified.

Figure 5:
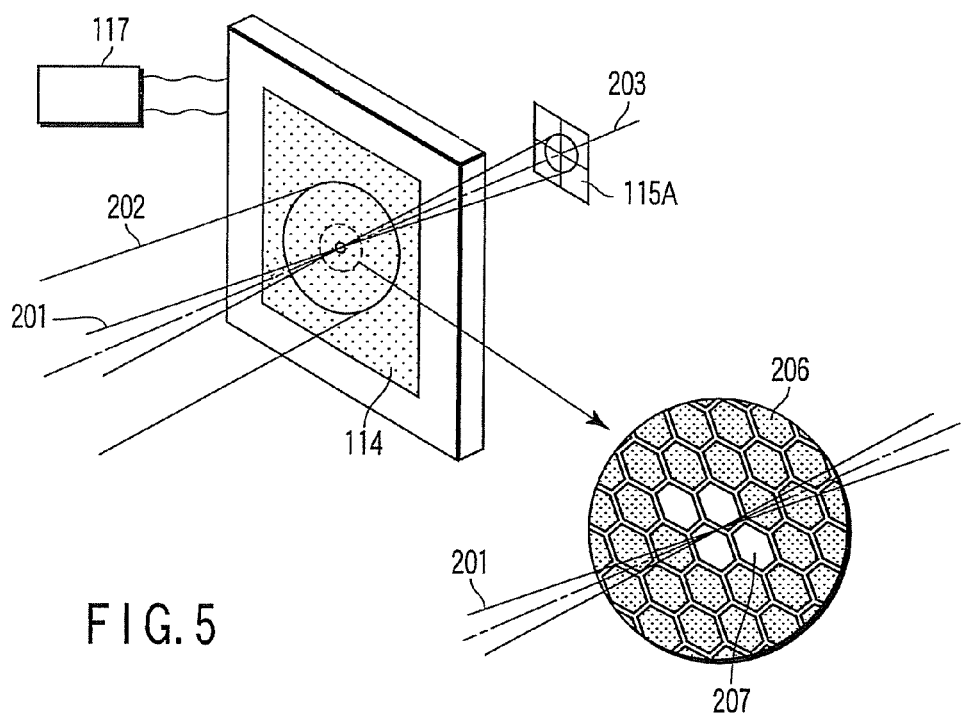
FIG. 5 shows details of another liquid crystal panel shown in FIG. 1.

The liquid crystal panel 114 shown in FIG. 2 has the square pixels 204, the shapes of the pixels are not limited to them, and the panel may have honeycomb-shaped pixels 206 as shown in, for example, FIG. 5. Even in this case, the pixels of the regions shown in white are brought into the transmitted states by the liquid crystal driver 117 to form the pinhole 205.

Second Embodiment

Figure 6:
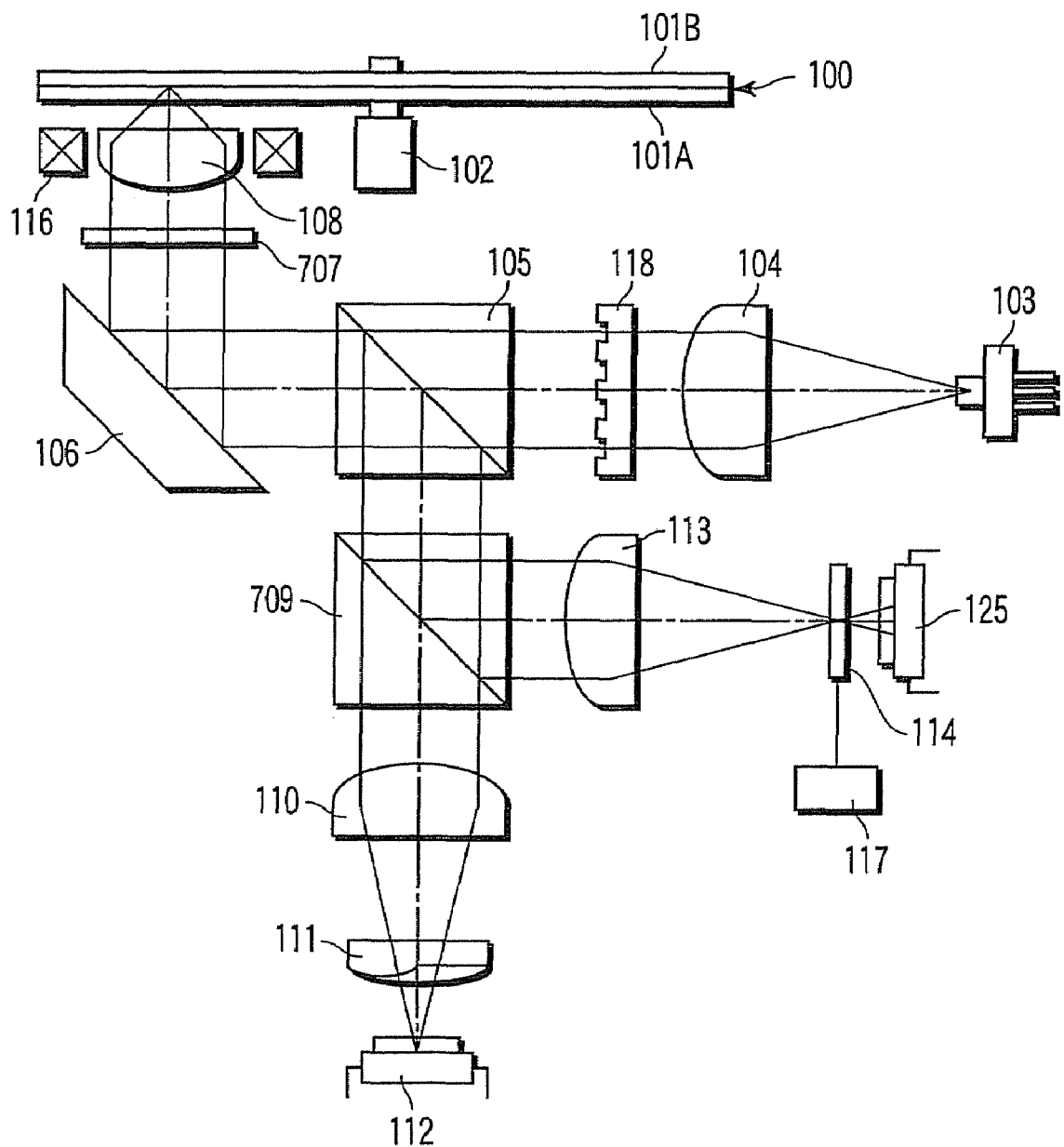
FIG. 6 shows an optical head device in a second embodiment of the present invention.

In a second embodiment of the present invention, as shown in FIG. 6, an optical head device has a constitution in which a diffraction grating 118 for three beams is added to the optical head device shown in FIG. 1. In general, in the optical head device, a light beam emitted from a light source are often split into multiple beams in order to generate a reproduction signal, a focal error signal, a tracking error signal and the like. FIG. 6 shows an example in which three light beams are formed in order to generate the tracking error signal by a differential push-pull (DPP) method.

Figure 7:
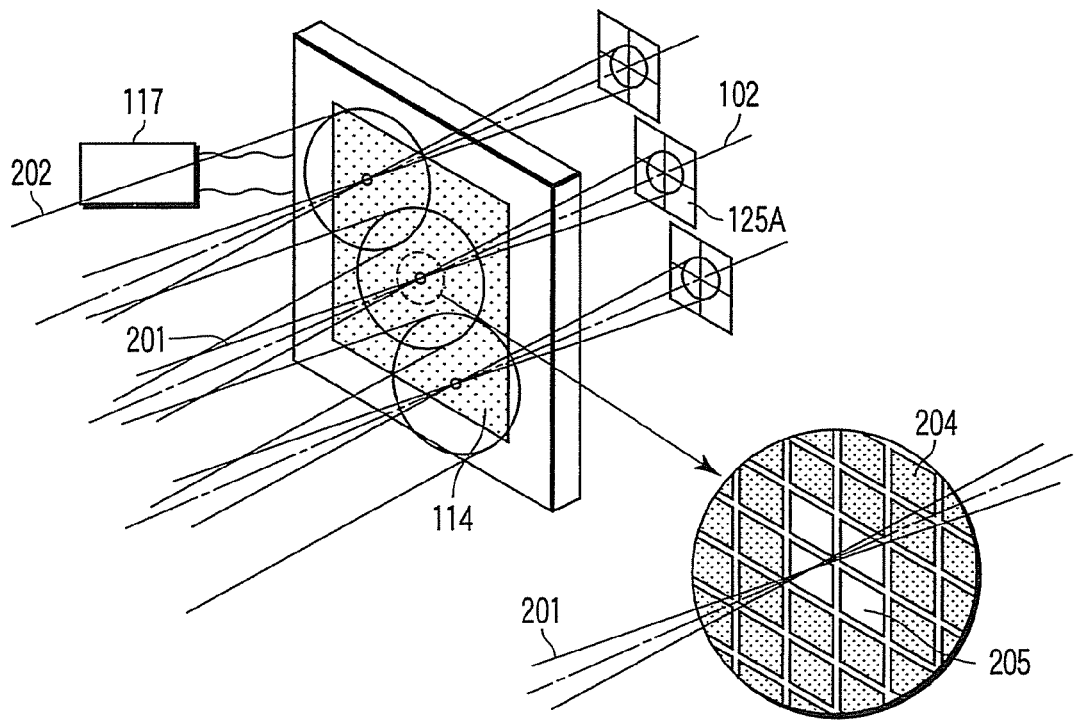
FIG. 7 shows details of a liquid crystal panel shown in FIG. 6.

A liquid crystal panel 114 is capable of easily handling such multiple beams. That is, as shown in FIG. 7, the liquid crystal panel 114 interrupts a large part of leak light 202, and it is possible to easily form three pinholes 205 which pass three beams as signal light 201 from a reproduction layer. As to a usual pinhole element provided with physical holes, it is difficult to adjust relative positions of pinholes in accordance with a solid difference of the optical head device. Therefore, it is remarkably difficult to simultaneously transmit beams through pinholes in the usual pinhole provided with the physical holes. However, this is easily possible by the liquid crystal panel 114 in the present embodiment.

During adjustment in assembling the optical head device of the present embodiment, a position of the liquid crystal panel 114 is basically adjusted by a method described above with reference to FIG. 4. The present embodiment is different from the second embodiment in that three light beams enter the liquid crystal panel 114, but the position of the panel may be adjusted using a main beam (0-order diffracted light from the diffraction grating 118 for three beams). That is, a collimation tester 303 may be disposed in a far position to such an extent that three beams are physically split, and the above procedure of steps S1 to S6 may be performed.

The second embodiment shows an example of the optical head device using three beams, but it is effective to form pinholes by the liquid crystal panel 114 even in an optical head device using two beams or four or more beams.

Third Embodiment

Figure 8:
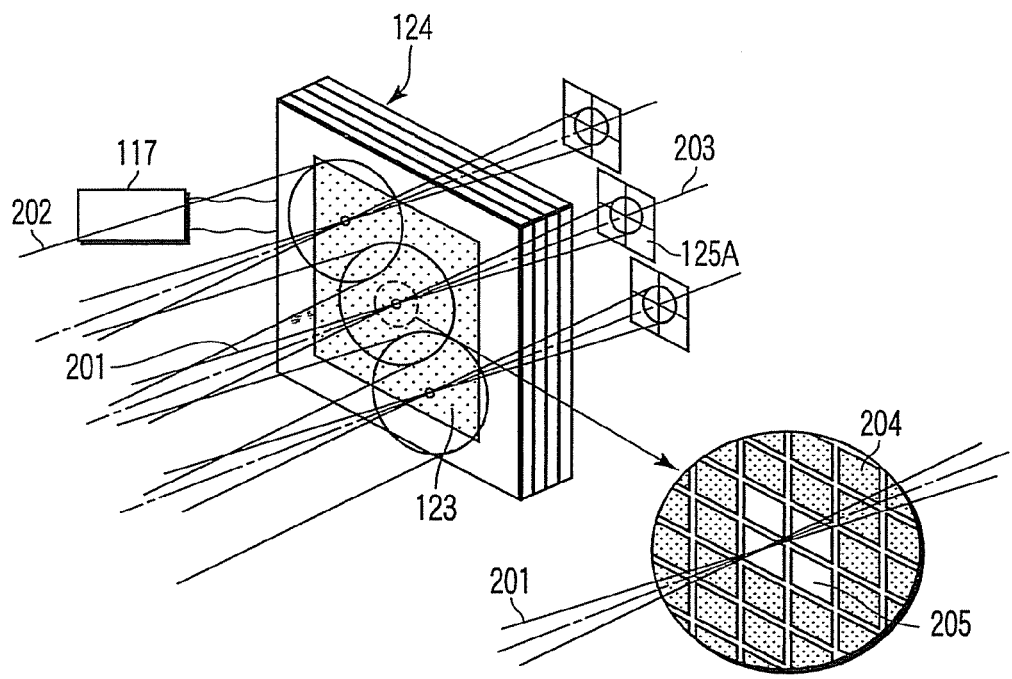
FIG. 8 shows details of a multilayered liquid crystal panel for use in an optical head device in a third embodiment of the present invention.

In a third embodiment of the present invention, an optical head device includes a multilayered liquid crystal panel 124 shown in FIG. 8 instead of the liquid crystal panel 114 for use in the second embodiment. The multilayered liquid crystal panel 124 includes unit panels 123 each of which is similar to the liquid crystal panel 114 described above, and these panels are laminated along an optical axis. Another constitution of the optical head device is similar to that of the second embodiment. A method of adjusting a position of the multilayered liquid crystal panel 124 along an optical axis during adjustment in assembling the optical head device is basically as described with reference to FIG. 4, but a treatment of the above-described step S6 is performed as follows in detail.

That is, among pixels 204 of the unit panels 123, pixels to which any light is not applied are turned off, and pixels to which the light is applied are turned on by a liquid crystal driver 117 to form pinholes 205 in the same manner as in the step S6. However, as shown in FIG. 9, the pixels 204 of the unit panel 123 of each layer of the multilayered liquid crystal panel 124 are turned on/off so that the pinhole 205 is formed near a focal point of a second condensing lens 113, especially in a focal point of signal light 201. In this case, there are advantages that margins in adjusting the position of the multilayered liquid crystal panel 124 along the optical axis increase and that the position adjustment is further facilitated.

During the laminating of the unit panels 123 in the multilayered liquid crystal panel 124, as shown in, for example, FIG. 10, the pixels 204 of one of the unit panels 123 may partially overlap with the pixels 204 of another one of the unit panels 123 in projection onto a plane perpendicular to the optical axis. This prevents light from being leaked between the pixels 204.

Fourth Embodiment

In a fourth embodiment of the present invention, an optical head device has a shielding element 401 shown in FIGS. 11A and 11B instead of the liquid crystal panel. The laser light source 103 is capable of selectively emitting a low-output light beam for use in recording and reproducing information and a high-output light beam having a higher energy density. Another constitution of the optical head device is similar to that of the first embodiment shown in FIG. 1. The shielding element 401 is disposed near a focal point of a condensing lens 113, and includes a transparent substrate 402 and a thin film 403 such as a Cr film deposited or formed by sputtering, plating or the like on the transparent substrate 402. As shown in FIG. 11B, a pinhole 404 is formed in the thin film 403.

Next, there will be described a method of adjusting the shielding element 401 shown in FIGS. 11A and 11B during adjustment in assembling the optical head device with reference to FIG. 12. A position of the shielding element 401 is adjusted by a procedure of the following steps S11 to S14, and the pinhole 404 is formed.

<Step S11>
A mirror disk 301 for adjustment is set instead of the optical disk 100, and an objective lens 108 is focused on the surface of the mirror disk 301 for adjustment by a lens actuator 116. A single-layer disk having a flat light reflecting face having a high reflectance may be used in the mirror disk 301 for adjustment.

<Step S12>
The light reflected by the shielding element 401 and transmitted through a beam splitter 109 is caused to enter a collimation tester 303 for adjustment.

<Step S13>
While observing a convergent/divergent state of incidence light by the collimation tester 303 for adjustment, the position of the shielding element 401 along the optical axis is adjusted so that the incidence light forms a parallel light beam. As a result, the thin film 403 of the shielding element 401 is disposed in a focal point of reflected light from the mirror disk 301 for adjustment, that is, a focal point of reflected light from a reproduction face of the optical disk 100. It is to be noted that since the second condensing lens 113 usually has a numerical aperture of about 0.06 to 0.08, the condensing lens 113 has a focal depth of about 30 μm to 60 μm. Therefore, the adjustment of the position of the shielding element 401 along the optical axis is not a difficult operation.

<Step S14>
A high-output light beam is output from the laser light source 103, and this high-output light beam is applied to the thin film 403 of the shielding element 401 to melt the film and form the pinhole 404 as shown in FIG. 11B.

The thin film 403 has, for example, such a film thickness that the film melts under the application of the high-output light beam in the step S14, that is, in a state in which a laser energy density is high, but does not melt under the application of the low-output light beam for use during the recording and the reproducing of the optical disk. Alternatively, the thin film 403 may be made of a material which melts under the application of the high-output light beam in the step S14 but does not melt under the application of the low-output light beam for use during the recording and the reproducing of the usual optical disk.

The shielding element 401 provided with the pinhole 404 in the steps S11 to S14 interrupts a large part of leak light from the non-reproduction layer during the reproducing of the information from the double-layer disk. On the other hand, the element transmits the signal light from the reproduction layer through the pinhole 404.

According to the fourth embodiment, interlayer crosstalk can be effectively reduced without requiring any mechanical adjustment of the shielding element 401 in an in-plane direction which is perpendicular to the optical axis.

It is to be noted that the present invention is not limited to the above embodiments as such, and constituting elements can be modified and embodied in an implementation stage within a range that does not depart from the scope. Various inventions can be formed by appropriately combining constituting elements disclosed in the above embodiments. For example, several constituting elements may be deleted from all of the constituting elements described in the embodiments. Furthermore, the constituting elements ranging over different embodiments may be appropriately combined. For example, the shielding element of the fourth embodiment may be combined with the optical head device using multiple beams as described in the second embodiment.

For example, there has been described an example in which the single-layer disk is used in the mirror disk 301 for adjustment in the above embodiments, but, for example, a multilayered disk having flat reflection faces may be used. In this case, reflected light from one of the reflection faces may be used.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general invention concept as defined by the appended claims and their equivalents.

What is claimed is:

1. An optical head device which reproduces information recorded in an optical disk including recording layers, comprising:
   a light source which emits a light beam, the light source being capable of selectively emitting a high-output light beam and a low-output light beam;
   an objective lens which condenses the light beam on the optical disk;
   a condensing lens which condenses reflected light from the optical disk;
   a shielding element disposed near a focal point of the condensing lens and having a pinhole, the shielding element including a transparent substrate and a thin film disposed on the transparent substrate, the thin film being partially melted by application of the high-output light beam to form the pinhole which passes the reflected light from a reproduction layer of the optical disk and partially interrupts the reflected light from a non-reproduction layer of the optical disk; and
   a photodetector which detects light passed through the pinhole of the shielding element.

2. The optical head device according to claim 1, wherein the pinhole is formed by applying the high-output light beam reflected by the reproduction layer to the thin film disposed in a condensing point of the reflected light from the reproduction layer of the optical disk.

3. The optical head device according to claim 1, wherein the thin film has such a film thickness that the film melts under the application of the high-output light beam but does not melt under the application of the low-output light beam.

4. The optical head device according to claim 1, wherein the thin film is of a material which melts under the application of the high-output light beam but does not melt under the application of the low-output light beam.

5. The optical head device according to claim 1, further comprising a beam split element which splits the light beam emitted from the light source into light beams, and wherein the shielding element includes pinholes, and the device includes photodetectors which detect beams of light passed through the pinholes of the shielding element.

* * * * *